United States Patent
Addy

(10) Patent No.: US 7,003,614 B2
(45) Date of Patent: Feb. 21, 2006

(54) METHOD AND APPARATUS FOR UTILIZING DIFFERENT FREQUENCIES ON A BUS BASED ON A NUMBER OF CARDS COUPLED TO THE BUS

(75) Inventor: Gary D. Addy, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/833,002

(22) Filed: Apr. 28, 2004

(65) Prior Publication Data

US 2004/0199707 A1 Oct. 7, 2004

Related U.S. Application Data

(63) Continuation of application No. 09/874,211, filed on Jun. 6, 2001, now Pat. No. 6,754,758.

(51) Int. Cl.
  G06F 13/00 (2006.01)
  G06F 13/38 (2006.01)
(52) U.S. Cl. ............... 710/306; 710/301; 713/501
(58) Field of Classification Search ........ 710/300–302, 710/104, 305, 313, 306; 713/501, 600; 709/230; 370/257
  See application file for complete search history.

(56) References Cited

U.S. PATENT DOCUMENTS

| 5,444,608 | A | | 8/1995 | Jain et al. |
| 5,875,310 | A | | 2/1999 | Buckland et al. |
| 5,884,094 | A | * | 3/1999 | Begun et al. ............ 710/10 |
| 5,937,173 | A | | 8/1999 | Olarig et al. |
| 6,008,665 | A | | 12/1999 | Kalb et al. |
| 6,108,731 | A | | 8/2000 | Suzuki et al. |
| 6,134,621 | A | * | 10/2000 | Kelley et al. ............ 710/311 |
| 6,185,692 | B1 | * | 2/2001 | Wolford ............ 713/501 |
| 6,345,328 | B1 | * | 2/2002 | Rozario et al. ............ 710/52 |

OTHER PUBLICATIONS

"A new bus assignment in a designed shared bus switch fabric" by Torres, D; Gonzalez, J; Guzman, M; nunez, L. (abstract onl Publication Date: May 30-Jun. 2, 1999.*

* cited by examiner

Primary Examiner—Gopal C. Ray
(74) Attorney, Agent, or Firm—Kenyon & Kenyon

(57) ABSTRACT

An apparatus and method are provided for operating a PCI-X bus. A device may be provided to determine a number of PCI-X cards coupled to the bus. A mechanism may be provided to control a frequency of the PCI-X bus based on the determined number of PCI-X cards coupled to the bus.

10 Claims, 3 Drawing Sheets

METHOD AND APPARATUS FOR UTILIZING DIFFERENT FREQUENCIES ON A BUS BASED ON A NUMBER OF CARDS COUPLED TO THE BUS

This is a continuation of application Ser. No. 09/874,211 filed 6 Jun. 2001, now U.S. Pat. No. 6,754,758, the content of which is incoprorated herein by reference in its entirety.

FIELD

The present invention is related to operation, use and control of a bus. More particularly, the present invention is related to the operation, use and control of different operating frequencies of a PCI-X bus.

BACKGROUND

Computer systems may utilize one or more buses as an interconnect transportation mechanism to transfer data between different internal components, such as one or more processors, memory subsystems and input/output (I/O) devices including, for example, keyboards, input mouses, disk controllers, serial and parallel ports to printers, scanners, and display devices. For computer systems using processors such as the 8088, 8086, 80186, i386™ and i486™ microprocessors designed and manufactured by Intel Corporation, such buses have typically been designed as either an Industry Standard Architecture (ISA) bus or an Expanded Industry Standard Architecture (EISA) bus. The ISA bus is a sixteen (16) bit data bus while the EISA bus is thirty-two (32) bits wide. Each of these buses may function at a frequency of eight (8) megahertz. However, the data transfer rates provided by these bus widths and operational frequencies may be limited.

For recent computer systems, such as servers, workstations or personal computers (PCs) using a "Pentium*" family of microprocessors (manufactured by Intel Corporation), for example, such buses may be Peripheral Component Interconnect (PCI) buses. The PCI buses are high performance 32 or 64 bit synchronous buses with automatic configurability and multiplexed address, control and data lines as described in the version of "PCI Local Bus Specification, revision 2.2" set forth by the PCI Special Interest Group (SIG) on Dec. 18, 1998. The PCI architecture may provide the most common method used to extend computer systems for add-on arrangements (e.g., expansion cards) with new video, networking, or disk memory storage capabilities.

When PCI buses are used as an interconnect transportation mechanism in a host system (e.g., server, workstation or PC), data transfer between a processor, a memory subsystem and I/O devices may be executed at high speed. Bridges (or hubs) may be provided to interface and buffer transfers of data between the processor, the memory subsystem, the I/O devices and the PCI buses. Examples of such bridges may include PCI-PCI bridges as described in detail in the "PCI-PCI Bridge Architecture Specification, revision 1.1" set forth by the PCI Special Interest Group (SIG) on Apr. 5, 1995.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto.

The following represents brief descriptions of the drawings in which like reference numerals represent like elements and wherein.

DETAILED DESCRIPTION

Figure 1:
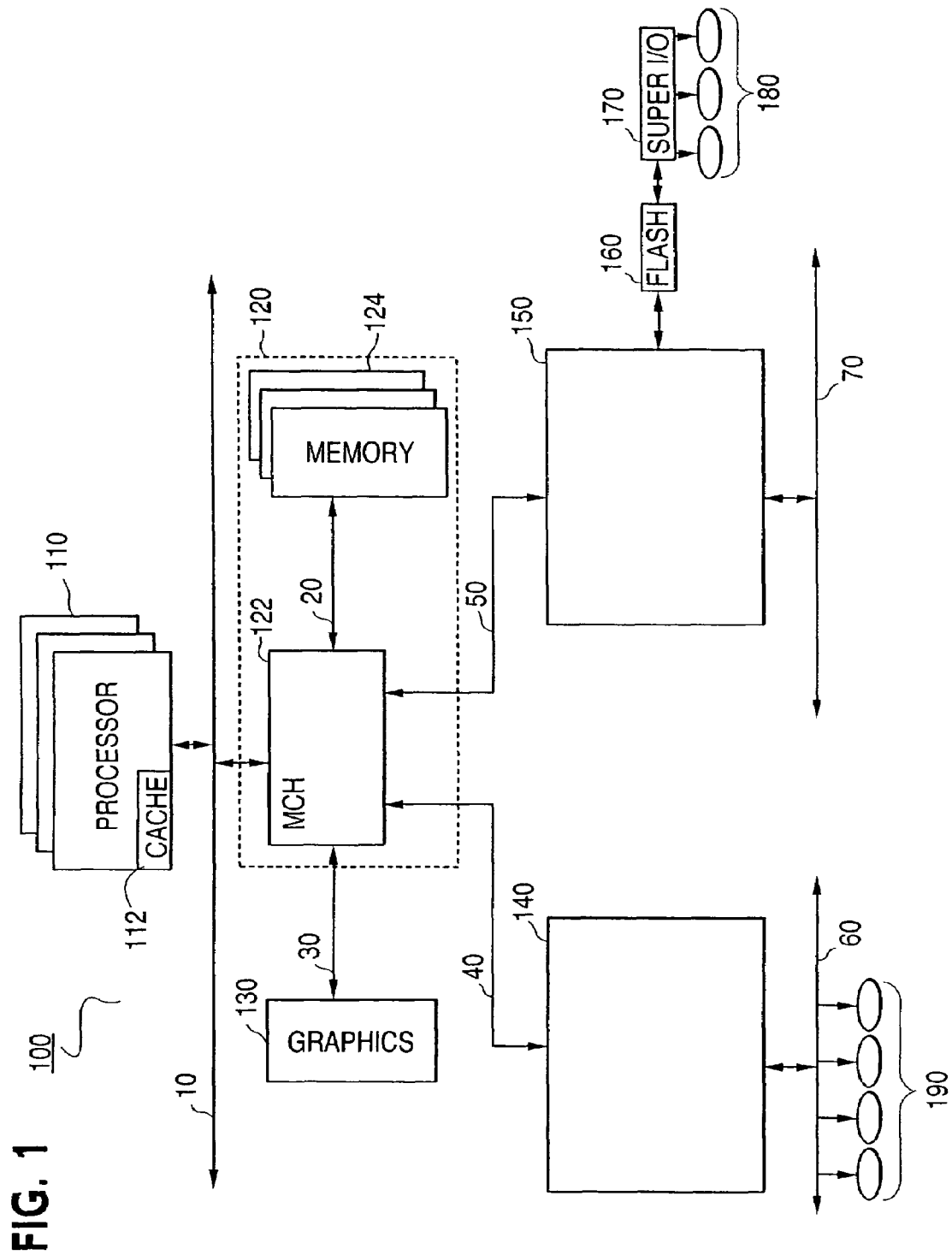
FIG. 1 illustrates one example embodiment of a computer system platform.

In the following detailed description, like reference numerals and characters may be used to designate identical, corresponding or similar components in differing figure drawings. Arrangements may be shown in block diagram form in order to avoid obscuring the invention, and also in view of the fact that specifics with respect to implementation of such block diagram arrangements may be highly dependent upon the platform within which the present invention is to be implemented. That is, such specifics are well within the purview of one skilled in the art. Where specific details (e.g., circuits) are set forth in order to describe example embodiments of the invention, it should be apparent to one skilled in the art that the invention can be practiced without, or with variation of, these specific details. It should also be apparent that differing combinations of hard-wired circuitry can be used to implement embodiments of the present invention. That is, embodiments of the present invention are not limited to any specific combination of hardware.

Still further, any reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

The present invention may be applicable for use with all types of system and peripheral buses, bridges and chipsets, including chipsets with PCI 64-bit hubs (P64H or P64H2) and P64H follow-on products, and new chipsets having internal buffers and data fetching control logics incorporated therein and new computer platforms that may become available as computer technology develops in the future. For the sake of simplicity, the following descriptions will concentrate mainly on exemplary use of a PCI-X bus and a P64H2 bridge (or hub), although the scope of the present invention is not limited thereto. For example, embodiments may also be applicable to a PCI bus and a P64H bridge.

FIG. 1 illustrates a computer system platform according to an example embodiment of the present invention. Other embodiments, mechanisms and platforms are also within the scope of the present invention. As shown in FIG. 1, the computer system 100 may include a processor subsystem 10, a memory subsystem 120 coupled to the processor subsystem 110 by a front side bus 10, graphics 130 coupled to the memory subsystem 120 by a graphics bus 30, one or more host chipsets (bridges 140-150) coupled to the memory subsystem 120 by hub links 40 and 50 for providing an interface with peripheral buses such as Peripheral Component Interconnect (PCI or PCI-X) buses 60 and 70 of different bandwidth and operating speeds, a flash memory 160, and a super I/O 170 coupled to the chipset 150 by a low pin count (LPC) bus for providing and interfacing with a plurality of I/O devices 180, including, for example, a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices. A plurality of I/O devices 190 may be provided by the PCI-X bus 60. The computer system 100 may be configured differently or employ some different components than those shown in FIG. 1.

The processor subsystem 110 may include a plurality of host processors and a cache subsystem 112. The memory subsystem 120 may include a memory controller hub (MCH) 122 coupled to the host processors by a front side bus 10 (i.e., host or processor bus) and at least one memory element 124 coupled to the MCH 122 by a memory bus 20. The memory element 124 may be a dynamic random-access-memory (DRAM), or may be a read-only-memory (ROM), a video random-access-memory (VRAM) and the like. The memory element 124 stores information and instructions for use by the host processors. The graphics 130 may be coupled to the main controller hub 122 of the memory subsystem 120 by a graphics bus 30, and may include, for example, a graphics controller, a local memory and a display device (e.g., cathode ray tube, liquid crystal display, flat panel display, etc.).

The host chipsets (labeled as bridge 140 and ICH 150) may be Peripheral Component Interconnect (PCI-X) bridges (e.g., host, PCI-PCI, or standard expansion bridges) in the form of PCI chips such as, for example, the PIIX4* chip and PIIX6* chip manufactured by Intel Corporation. In particular, the chipsets (labeled as bridge 140 and ICH 150) may correspond to a Peripheral Component Interconnect (PCI-X) 64-bit hub (P64H2 bridge 140) and an input/output controller hub (ICH 150). Embodiments of the present application are also applicable to a P64H bridge (or hub) although the following embodiments will be described with respect to the P64H2 bridge (or hub). Further, although not shown, the bridge 140 may be coupled to more than one bus 60.

The P64H2 bridge 140 and the ICH 150 may be coupled to the MCH 122 of the memory subsystem 120 respectively by 16 bits and 8 bits hub links 40 and 50, for example, and may operate as an interface between the front side bus 10 and the peripheral buses 60 and 70 such as PCI buses of different bandwidths and operating speeds. The PCI buses may be high performance 32 or 64 bit synchronous buses with automatic configurability and multiplexed address, control and data lines as described in the latest version of "PCI Local Bus Specification, Revision 2.2" set forth by the PCI Special Interest Group (SIG) on Dec. 18, 1998 for add-on arrangements (e.g., expansion cards) with new video, networking, or disk capabilities or as described with respect to the latest version of "PCI-X Addendum to the PCI Local Bus Specification, Revision 1.0a" set forth by the PCI Special Interest Group on Jul. 24, 2000. A PCI bus of 64-bits and 66 MHz may connect to the P64H2 bridge 140 or a PCI bus of 32-bit and 33 MHz may connect to the ICH 150. Other types of bus architectures such as Industry Standard Architecture (ISA), Expanded Industry Standard Architecture (EISA) and PCI-X buses may also be utilized. These buses may operate at different frequencies such as 33 MHz, 66 MHz, 100 MHz and 133 MHz, for example. Other frequencies are also within the scope of the present invention.

In the preferred embodiment of the present invention, the hub links 40 and 50 that couple the P64H2 bridge 140 and the ICH 150 to the MCH 122 of the memory subsystem 120 may be primary PCI buses of different bandwidths and operating speeds. The peripheral buses 60 and 70 that couple the P64H2 bridge 140 and the ICH 150 to I/O devices may be secondary PCI buses having different bandwidths and operating speeds.

Embodiments of the present invention may provide a method for operating a bus, such as a PCI bus or a PCI-X bus. This may include determining a number of cards coupled to the bus (or determining more than one card is coupled to the bus). The bus may thereafter operate at a predetermined frequency based on the determined number of cards that are coupled to the bus. For example, if a first PCI-X card is received in a first PCI-X slot and is coupled to the PCI-X bus, then the bus may operate at a frequency of 133 MHz.

On the other hand, if a first PCI-X card is received in a first PCI-X slot so as to be coupled to the PCI-X bus and a second PCI-X card is received in a second PCI-X slot so as to be coupled to the PCI-X bus, then the PCI-X bus may operate at a slower frequency of 100 MHz. This allows the system to better utilize the PCI-X bus when not all of the available PCI-X slots are used. Accordingly, embodiments of the present invention allow the PCI-X bus to operate at 133 MHz when a first PCI-X card is coupled to the bus and to slow the PCI-X bus down to 100 MHz if a second PCI-X card is further coupled to the bus. A mother board may include two P64H2 bridges, each of which supports two buses. Each PCI-X bus may be coupled to two PCI-X connectors (or slots). Thus, the mother board may include eight PCI-X connectors. If a PCI-X card is provided in every other slot (i.e, four slots) then the system may operate at a faster 133 MHz since each bus may only have one card coupled to the bus. However, if an additional PCI-X card is added to one of the empty slots, then one respective PCI-X bus may slow down to 100 MHz. The remaining three PCI-X buses may still operate at 133 MHz.

Figure 2:
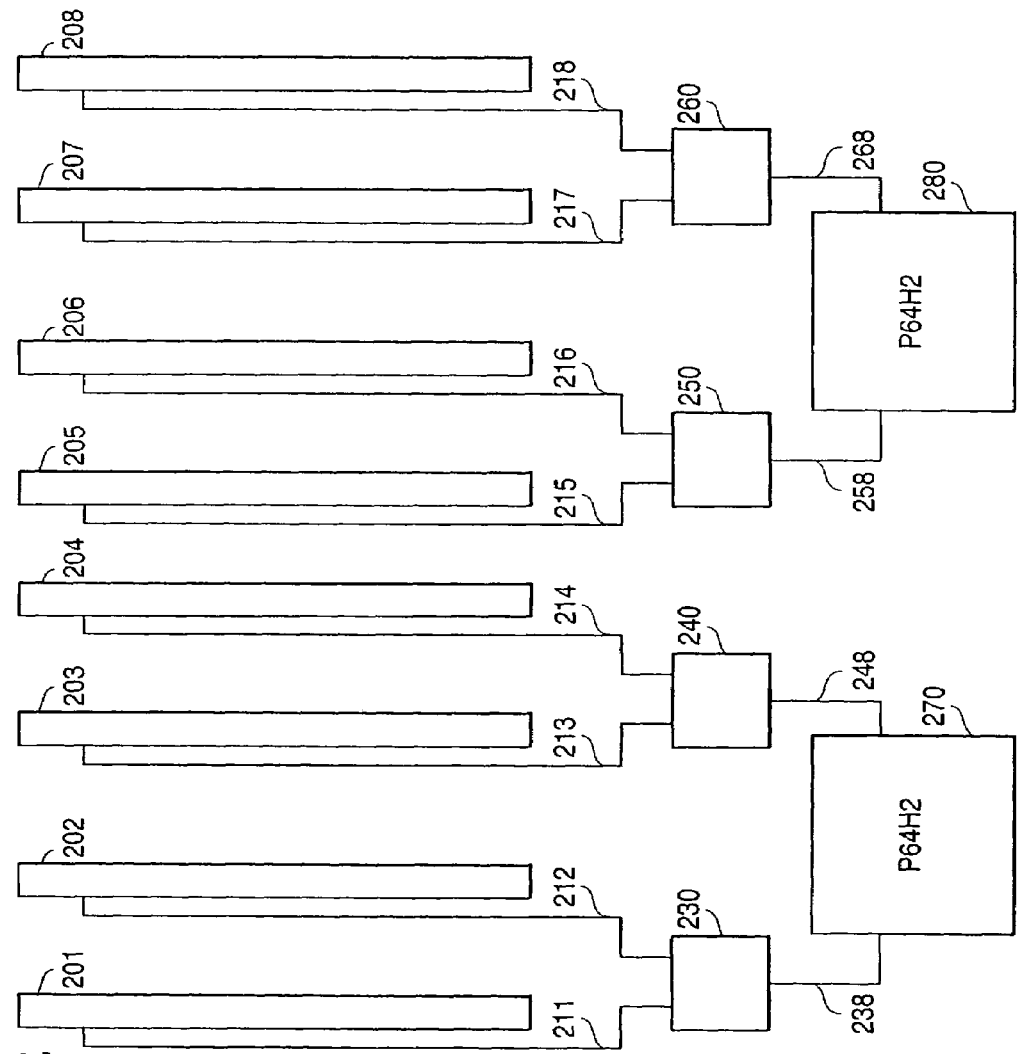
FIG. 2 illustrates PCI slots, logic and PCI bridges according to an example embodiment of the present invention.

FIG. 2 illustrates PCI-X slots, logic and PCI-X bridges according to an example embodiment of the present invention. Other embodiments and configurations are also within the scope of the present invention. More specifically, FIG. 2 shows a first PCI-X slot 201, a second PCI-X slot 202, a third PCI-X slot 203, a fourth PCI-X slot 204, a fifth PCI-X slot 205, a sixth PCI-X slot 206, a seventh PCI-X slot 207 and an eighth PCI-X slot 208. FIG. 2 further shows logic circuits 230, 240, 250 and 260 and P64H2 bridges 270 and 280. Each of the P64H2 bridges 270 and 280 may correspond to the P64H2 bridge 140 shown in FIG. 1. Each P64H2 bridge 270 and 280 may be coupled to two separate PCI-X buses. Each PCI-X bus may be coupled to two PCI-X cards (or connectors) by two slots. For example, the P64H2 bridge 270 may operate and control two PCI-X buses. The first bus may couple to devices through the first slot 201 and the second slot 202. The second bus may couple to devices through the third slot 203 and the fourth slot 204. Likewise, the P64H2 bridge 280 may control and operate two PCI-X buses. The first bus may couple to devices through the fifth slot 205 and the sixth slot 206. The second bus may couple to devices through the seventh slot 207 and the eighth slot 208.

FIG. 2 further shows a signal line 211 coupled between a pin of the first slot 201 and the logic circuit 230 and a signal line 212 coupled between a pin of the second slot 202 and the logic circuit 230. A signal line 213 is coupled between a pin of the third slot 203 and the logic circuit 240 and a signal line 214 is coupled between a pin of the fourth slot 204 and the logic circuit 240. Additionally, a signal line 215 is coupled between a pin of the fifth slot 205 and the logic circuit 250 and a signal line 216 is coupled between a pin of the sixth slot 206 and the logic circuit 250. A signal line 217 is coupled between a pin of the slot 207 and the logic circuit 260 while a signal line 218 is coupled between a pin of the eighth slot 208 and the logic circuit 260. FIG. 2 also shows a signal line 238 coupled between the logic circuit 230 and a pin of the P64H2 bridge 270. A signal line 248 couples the logic circuit 240 to a pin of the P64H2 bridge 270. Still further, a signal line 258 couples the logic circuit 250 to a pin of the P64H2 bridge 280 and a signal line 268 couples the logic circuit 260 to a pin of the P64H2 bridge 280.

In FIG. 2, each of the logic circuits 230, 240, 250 and 260 may receive a signal across one of the signal lines 211–218. The logic circuits 230, 240, 250 and 260 determine if any cards are provided in the respective slots 201-208 based on the signals received on the signal lines 211–218. More specifically, a signal may be output along the signal line 211 indicating that a card (or connector) is provided within the first slot 201. A signal may be output along the signal line 212 indicating that a card (or connector) is provided within the second slot 202. For example, the signal may be HIGH if a PCI-X card is provided within the slot and may be LOW if a PCI-X card is not provided within the slot. Alternatively, a signal may be LOW if a PCI-X card is provided within the slot and may be HIGH if a PCI-X card is not provided within the slot. The logic circuit 230 produces an output signal on the signal line 238 indicative of whether two cards or less than two cards are provided in the slots 201 and 202. For example, the logic circuit 203 may output a LOW signal on the signal line 238 if only one card is provided within the slot 201 and the slot 202. The logic circuit 203 may output a HIGH signal if two cards are provided within the slots 201 and 202. For this embodiment, the logic circuit 203 may also output a LOW signal if there are no cards within the slots 201 and 202. Each of the logic circuits 240, 250 and 260 may also operate in a similar manner as the logic circuit 230.

The P64H2 bridge 270 may include a mechanism or control mechanisms to change the operating frequency of the first bus (associated with the slots 201 and 202) based on the signal on the signal line 238. For example, if a card is separately provided within each of the slots 201 and 202, then the control mechanism within the P64H2 bridge 270 may operate the bus (associated with the slots 201 and 202) at 100 MHz (or approximately 100 MHz). Alternatively, if only one card is provided within both of the slots 201 and 202, then the control mechanism within the P64H2 bridge 270 may operate the bus (associated with the slots 201 and 202) at 133 MHz (or approximately 133 MHz). Similarly, the P64H2 bridge 270 may also include a mechanism or control logic to change the operating frequency of the second bus (associated with the slots 203 and 204) based on the signal on the signal line 248. For example, if a card is separately provided within each of the slots 203 and 204, then the control mechanism within the P64H2 bridge 270 may operate the bus (associated with the slots 203 and 204) at 100 MHz (or approximately 100 MHz). Alternatively, if only one card is provided within both of the slots 203 and 204, then the control mechanism within the P64H2 bridge 270 may operate the bus (associated with the slots 203 and 204) at 133 MHz (or approximately 133 MHz). Accordingly, the P64H2 bridge 270 controls an operating frequency of a PCI-X bus associated with the slots 201 and 202 and also controls an operating frequency of a PCI-X bus associated with the slots 203 and 204. Similarly, the P64H2 bridge 280 controls an operating frequency of a PCI-X bus associated with the slots 205 and 206 based on a signal on the signal line 258 and also controls an operating frequency of a PCI-X bus associated with the slots 207 and 208 based on a signal on the signal line 268. Using the above described mechanisms and logic circuits, the P64H2 bridges 270 and 280 may control operating frequencies of the various PCI-X buses based on the determined number of cards provided within the respective slots.

Figure 3:
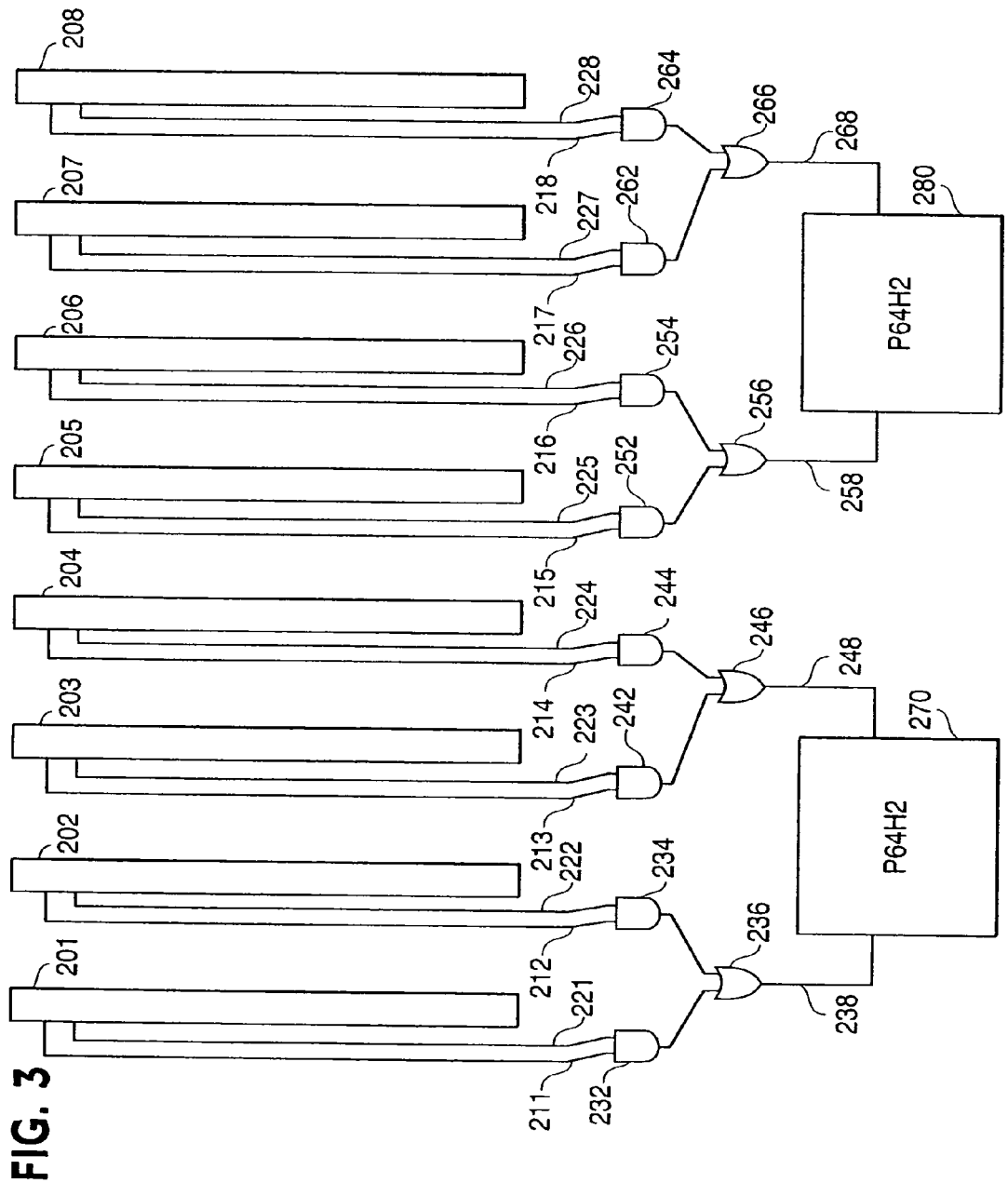
FIG. 3 illustrates PCI slots, logic and PCI bridges according to an example embodiment of the present invention.

FIG. 3 illustrates PCI-X slots, logic and PCI-X bridges according to another example embodiment of the present invention. Other embodiments and configurations are also within the scope of the present invention. FIG. 3 shows two signal lines coupled to each slot that will be used to determine if a card is provided with the slot. The two signal lines will be coupled to a logical AND gate. The output of each logical AND gate is coupled to an input of a logical OR gate which provides an output signal to one of the P64H2 bridges.

More specifically, FIG. 3 shows the signal line 211 and a signal line 221 coupled separate pins of the slot 201 and to inputs of a logical AND gate 232. The signal line 212 and a signal line 222 are coupled to separate pins of the slot 202 and to inputs of a logical AND gate 234. The logical AND gate 232 performs a logical AND operation on the input signals and provides an output to a logical OR gate 236. The logical AND gate 234 performs a logical AND operation on its input signals and provides an output to the logic OR gate 236. The logical OR gate 236 performs a logical OR operation on its input signals and provides an output signal on the signal line 238 to the P64H2 bridge 270.

FIG. 3 additionally shows the signal line 213 and a signal line 223 coupled to separate pins of the slot 203 and to inputs of a logical AND gate 242. The signal line 214 and a signal line 224 are coupled to separate pins of the slot 203 and to inputs of a logical AND gate 244. The logical AND gate 242 performs a logical AND operation on its input signals and provides an output to a logical OR gate 246. The logical AND gate 244 performs a logical AND operation on its input signals and provides an output to the logical OR gate 246. The logical OR gate 246 performs a logical OR operation on its input signals and provides an output signal on the signal line 248 to the P64H2 bridge 270.

Additionally, FIG. 3 shows the signal line 215 and a signal line 225 coupled to separate pins of the slot 205 and to inputs of a logical AND gate 252. The signal line 216 and a signal line 226 are coupled to separate pins of the slot 206 and to inputs of a logical AND gate 254. The logical AND gate 252 performs a logical AND operation on its input signals and provides an output to a logical OR gate 256. The logical AND gate 254 performs a logical AND operation on its input signals and provides an output to a logical OR gate 256. The logical OR gate 256 performs a logical OR operation on its input signals and provides an output signal on the signal line 258 to the P64H2 bridge 280.

FIG. 3 also shows the signal line 217 and a signal line 227 coupled to separate pins of the slot 207 and to inputs of a logical AND gate 262. The signal line 218 and a signal line 228 are coupled to separate pins of the slot 208 and to inputs of a logical AND gate 264. The logical AND gate 262 performs a logical AND operation on its input signals and provides an output to a logical OR gate 266. The logical AND gate 264 performs a logical AND operation on its input signals and provides an output to a logical OR gate 266. The logical OR gate 266 performs a logical OR operation on its input signals and provides an output signal on the signal line 268 to the P64H2 bridge 280.

In a similar manner as described above with respect to FIG. 2, a status (HIGH or LOW) of the signal on the signal line 238 may be used to determine an operating frequency of a PCI-X bus associated with the first slot 201 and the second slot 202. A status of the signal on the signal line 248 may be used to determine an operating frequency of a PCI-X bus associated with the third slot 203 and the fourth slot 204. Still further, a status of the signal on the signal line 258 may be used to determine an operating frequency of a PCI-X bus associated with the fifth slot 205 and the sixth slot 206. A status of the signal on the signal line 268 may be used to determine an operating frequency of a PCI-X bus associated with the seventh slot 207 and the eighth slot 208.

The above described "PCI Local Bus Specification, Revision 2.2" and "PCI-X Addendum to Local Bus Specification, Revisions 1.0a" sets forth specific names for pins on the PCI-X slots and P64H2 bridge. In one example embodiment, the signal line 211 may be provided to pin B9 of the slot 201 and the signal line 221 may be coupled to pin B11 of the slot 201. The signal line 212 may be coupled to pin B9 of the slot 202 and the signal line 221 may be coupled to pin B11 of the slot 202. Similarly, the signal lines 213, 214, 215, 216 and 217 may be coupled to the respective pin B9 of the slots 203, 204, 205, 206 and 207, respectively. The signal lines 223, 224, 225, 226 and 227 may be coupled to the respective pin B11 of the slots 203, 204, 205, 206 and 207, respectively. The signal line 238 output from the logical OR gate 236 may be coupled to pin E23 of the P64H2 bridge 270. Furthermore, the signal line 248 output from the logical OR gate 246 may be coupled to pin H6 of the P64H2 bridge 270. The signal line 258 output from the logical OR gate 256 may be coupled to pin E23 of the P64H2 bridge 280 and the signal line 268 output from the logical OR gate 266 may be coupled to pin H6 of the P64H2 bridge 280.

While embodiments of the present invention have been described with respect to logical circuits coupled between the slots and the P64H2 bridges, other types of logical circuits or devices may also provide similar features. For example, other combinations of logical gates are also within the scope of the present invention. Furthermore, while embodiments of the present invention have been described with respect to changing the operating frequency of a PCI-X between approximately 100 MHz and approximately 133 MHz based on a number of cards in slots, other operating frequencies are also with the scope of the present invention. Furthermore, embodiments of the present invention are also applicable to other types of buses.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses may also be apparent to those skilled in the art.

What is claimed is:

1. A system comprising:
    a processor;
    a memory to store instructions;
    a front side bus coupled between the processor and the memory;
    a peripheral bus;
    a mechanism coupled between the front side bus and the peripheral bus;
    a a plurality of slots coupled to the peripheral bus; and
    a logic circuit coupled to a first slot of the plurality of slots, the logic circuit to receive a first signal to indicate whether a first card is present in the first slot;
    wherein the mechanism is further coupled to the logic circuit to control a frequency of the peripheral bus based on a number of cards present in the plurality of slots.

2. The system of claim 1, wherein the plurality of slots are to couple cards therein to the peripheral bus.

3. The system of claim 1, wherein the peripheral bus comprises a Peripheral Component Interconnect (PCI) bus.

4. The system of claim 1, wherein the mechanism is to operate the bus at a first frequency for a first number of cards present, and to operate the bus at a second frequency different from the first frequency for a second number of cards present different from the first number.

5. The system of claim 4, wherein the first frequency comprises approximately 133 MHz and the second frequency comprises approximately 100 MHz.

6. A method comprising:
    coupling a logic circuit between a plurality of slots associated with a bus and a frequency control circuit, the logic circuit to receive a first signal to indicate whether a first card is present in a first slot of the plurality of slots; and
    causing the frequency control circuit to control a frequency of the bus based on a number of cards present in the plurality of slots.

7. The method of claim 6, wherein the plurality of slots are to couple cards therein to the peripheral bus.

8. The method of claim 6, wherein the peripheral bus comprises a Peripheral Component Interconnect (PCI) bus.

9. The method of claim 7, wherein the frequency control circuit operates the bus at a first frequency for a first number of cards present, and operates the bus at a second frequency different from the first frequency for a second number of cards present different from the first number.

10. The method of claim 9, wherein the first frequency comprises approximately 133 MHz and the second frequency comprises approximately 100 MHz.

* * * * *